(12) United States Patent
Lundberg (10) Patent No.: US 8,773,588 B2
(45) Date of Patent: *Jul. 8, 2014

(54) METHOD AND APPARATUS FOR DE-INTERLACING VIDEO

(71) Applicant: Axis AB, Lund (SE)

(72) Inventor: Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,393

(22) Filed: Feb. 6, 2014

(65) Prior Publication Data

US 2014/0152892 A1 Jun. 5, 2014

Related U.S. Application Data

(63) Continuation of application No. 13/966,937, filed on Aug. 14, 2013, now Pat. No. 8,670,071.

(60) Provisional application No. 61/696,627, filed on Sep. 4, 2012.

(30) Foreign Application Priority Data

Aug. 31, 2012 (EP) ..................... 12182641

(51) Int. Cl.
*H04N 7/01* (2006.01)
*H04N 11/20* (2006.01)

(52) U.S. Cl.
CPC .................... *H04N 7/0117* (2013.01)
USPC ........... 348/458; 348/441; 348/446; 348/448; 348/449; 348/452; 348/454; 348/456; 348/459; 348/490; 348/430.1; 348/513; 348/515; 348/521; 348/526; 348/550; 348/558; 348/559; 348/620; 348/699; 348/700; 348/701; 348/715; 348/317; 345/204

(58) Field of Classification Search
USPC ......... 348/458, 448, 441, 446, 449, 490, 452, 348/456, 459, 521, 558, 620, 699, 700, 701, 348/430.1, 454, 513, 515, 550, 559, 715, 348/317; 345/204
See application file for complete search history.

(56) References Cited

U.S. PATENT DOCUMENTS 4,800,436 A * 1/1989 Polaert et al. ................. 348/768
6,166,773 A * 12/2000 Greggain et al. ............. 348/448

(Continued)

OTHER PUBLICATIONS

Lin, S-F et al., "Motion Adaptive Interpolation With Horizontal Motion Detection for Deinterlacing" IEEE Transactions on Consumer Electronics, IEEE Service Center, New York, NY, US vol. 49, No. 4, Nov. 1, 2003, pp. 1256-1265 (XP001201274).

*Primary Examiner* — Jefferey Harold
*Assistant Examiner* — Mustafizur Rahman
(74) *Attorney, Agent, or Firm* — Volpe and Koenig, P.C.

(57) ABSTRACT

A method for de-interlacing interlaced video includes receiving a first video field and a second video field of an interlaced video frame, generating a first video frame from the first video field and a first synthesized video field, where video data of the first synthesized video field is based exclusively on video data of the first and second video fields, generating a second video frame from the second video field and a second synthesized video field, where video data of the second synthesized video field is based exclusively on the video data of the first and second video fields, and outputting two de-interlaced video frames for every received interlaced video frame. The first (second) synthesized video field is generated by combining image data from the second (first) video field with image data from corresponding lines of an up-scaled first (second) field generated by a scaler.

20 Claims, 5 Drawing Sheets

(56) References Cited

U.S. PATENT DOCUMENTS

| | | | |
|---|---|---|---|
| 6,414,719 B1 * | 7/2002 | Parikh | 348/448 |
| 6,628,341 B1 * | 9/2003 | Staley et al. | 348/607 |
| 6,680,752 B1 * | 1/2004 | Callway et al. | 348/448 |
| 7,349,029 B1 * | 3/2008 | Chou | 348/448 |
| 7,405,765 B2 * | 7/2008 | Chao | 348/448 |
| 7,876,379 B2 * | 1/2011 | Estrop | 348/445 |
| 8,228,429 B2 * | 7/2012 | Lu et al. | 348/448 |
| 2005/0212960 A1 * | 9/2005 | Chao | 348/448 |
| 2008/0259206 A1 | 10/2008 | Lu et al. | |
| 2010/0316125 A1 * | 12/2010 | Chappalli et al. | 375/240.16 |

* cited by examiner

METHOD AND APPARATUS FOR DE-INTERLACING VIDEO

CROSS REFERENCE TO RELATED APPLICATIONS

This application is a continuation of U.S. patent application Ser. No. 13/966,937, filed Aug. 14, 2013, which claims the benefit of U.S. provisional Application No. 61/696,627 filed Sep. 4, 2012, and European Patent Application No. 12182641.6 filed Aug. 31, 2012, which are incorporated by reference as if fully set forth.

TECHNICAL FIELD OF THE INVENTION

The present invention relates to de-interlacing of video and in particular to a method and an apparatus for de-interlacing interlaced video.

BACKGROUND OF THE INVENTION

Figure 1:
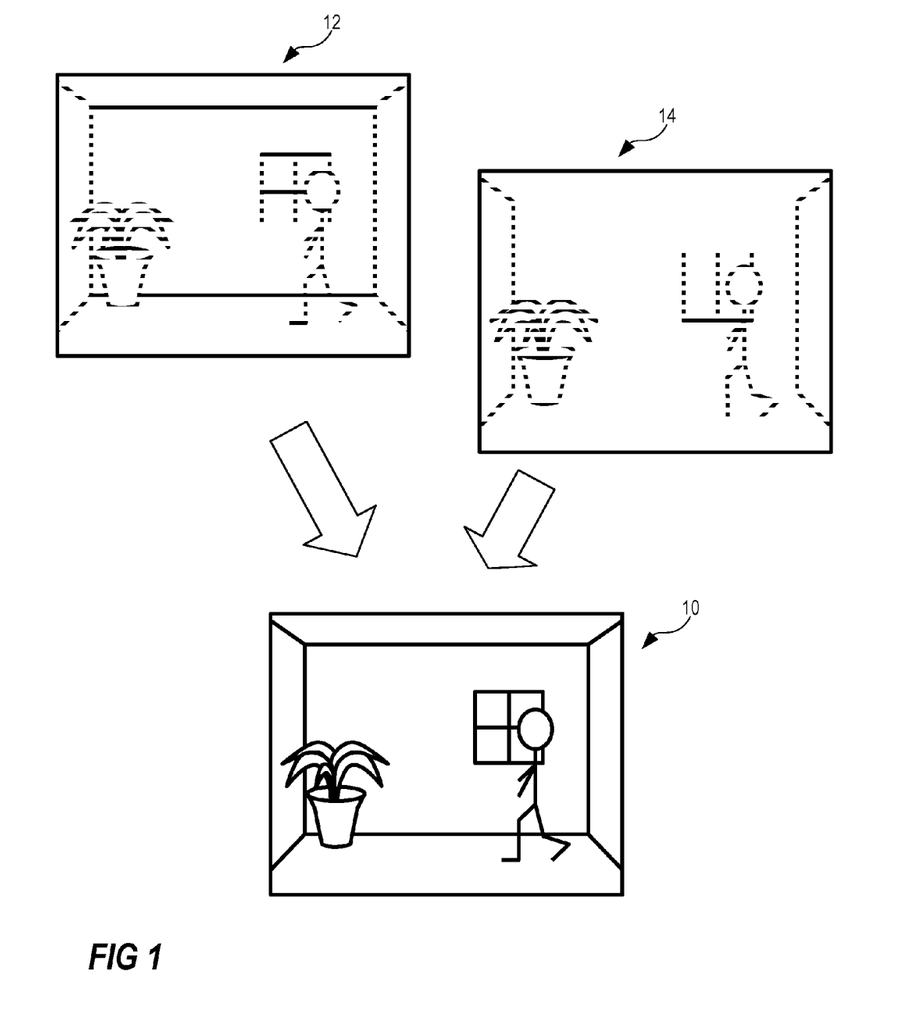
FIG. 1 is a schematic view depicting how de-interlacing of interlaced video generally is working.
Figure 2:
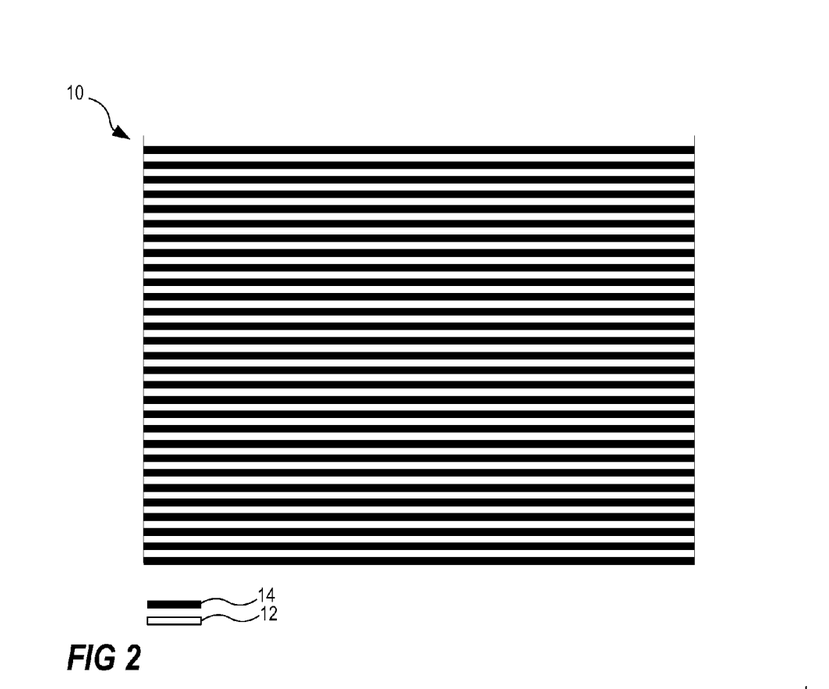
FIG. 2 is a schematic view of the fields forming an interlaced frame.

Interlaced video is a technique that is commonly used in video recording systems and in television broadcast systems. The purpose of interlaced video is to increase the quality by doubling the line resolution, i.e., the vertical resolution, without doubling the required bandwidth. In interlaced video formats, a video frame 10, see FIGS. 1 and 2, includes two sets of horizontal video lines 12, 14, also referred to as fields, captured at different points in time. Each set of video lines 12, 14, or each field, comprises substantially half of the lines that are forming the full video frame. One basic way to display an interlaced video frame would be to display a first field 12, e.g., including odd numbered lines, at one instant and then display a second field 14, e.g., including even numbered lines, at the next instant.

Figure 3:
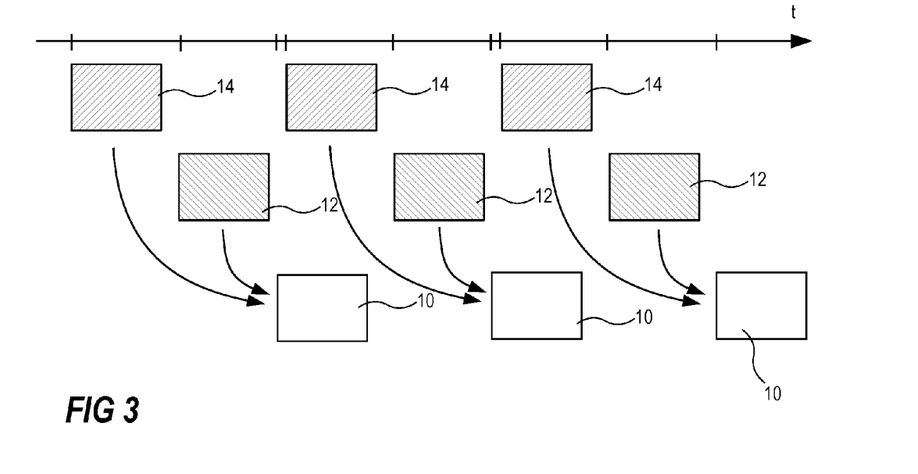
FIG. 3 is a schematic view of the operation of the general principles of de-interlacing.

In order to display the video in progressive or noninterlaced format, interlaced video must be de-interlaced. De-interlacing requires two fields 12, 14, to be merged into one de-interlaced video frame 16, see FIG. 3. However, the two fields 12, 14, are captured at different points in time and a video sequence including motion will present a "combing" effect where alternate lines represents an image that is slightly displaced from each other.

There are various methods for de-interlacing video, each presenting some kind of artifacts or other problems. The various methods may be grouped into field combination de-interlacers, field extension de-interlacers, and motion detecting de-interlacers. Field combination de-interlacers take the lines of the two fields 12, 14, and combine them into one de-interlaced video frame 16 which is then displayed. Examples of specific methods are weaving, blending, selective blending, and telecide style algorithms. Field extension de-interlacers take each field, i.e., half the lines of a frame, and extend them to the entire screen to make a frame. Examples of specific methods are half-sizing and line doubling. Motion detecting de-interlacers often uses both of the above methods combined with edge detection and other techniques. Some of the methods are able to generate video having twice the frame rate of the original, using the fact that the fields are sent at twice the rate of the frame rate and some interpolating algorithms. A problem with the methods generating video having twice the frame rate is that they either produce video of pour quality or is very complex and computationally heavy.

SUMMARY OF THE INVENTION

An improved method for de-interlacing interlaced video is described. In an embodiment, a method for de-interlacing interlaced video includes receiving a first video field and a second video field of an interlaced video frame, generating a first video frame from the first video field and a first synthesized video field, where video data of the first synthesized video field is based exclusively on video data of the first and second video fields, generating a second video frame from the second video field and a second synthesized video field, where video data of the second synthesized video field is based exclusively on the video data of the first and second video fields, and outputting two de-interlaced video frames for every received interlaced video frame. The first (second) synthesized video field is generated by combining image data from the second (first) video field with image data from corresponding lines of an up-scaled first (second) field generated by a scaler.

In another embodiment, the method comprises receiving a first video field and a second video field of an interlaced video frame, generating a first video frame by inserting the first video field in the first video frame on every second line of the first video frame and by inserting a first synthesized video field on the lines of the first video frame not populated by the first video field, wherein the video data of the first synthesized video field is based on video data of the second video field and on video data of the first field, generating a second video frame by inserting the second video field in the second video frame on every second line of the second video frame and by inserting a second synthesized video field on the lines of the second video frame not populated by the second video field, wherein the video data of the second synthesized video field is based on video data of the second video field and the received video field not being the second video field, and outputting two de-interlaced video frames for every received interlaced video frame.

One advantage of this de-interlacing method is that a doubled frame rate is achieved in a way that results in good quality video at a relatively low computational cost.

According to a further embodiment, the video field not being the second video field is the first video field.

According to another embodiment, a third video field is received that is not the second video field.

In yet another embodiment, the received video fields are received at different points in time.

In a further embodiment, the first video field is received before the second video field.

In another embodiment, each of the first and second synthesized video fields is generated by applying algorithm $S=(UL+F(Lmax-L))/Lmax$ on the video fields that the synthesized video field is to be based on, wherein S is the synthesized video field, U is the corresponding field generated by a field upscaler, F is the corresponding field in the interlaced frame, L is an indicator of a motion level in the received frames, and Lmax is the largest value Lmax may represent.

According to another aspect of the invention, a de-interlacer includes a video mixer and is arranged to perform the previously described de-interlacing method.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the Figures, like reference characters designate like or corresponding parts throughout the several Figures.

DETAILED DESCRIPTION OF EMBODIMENTS

Figure 4:
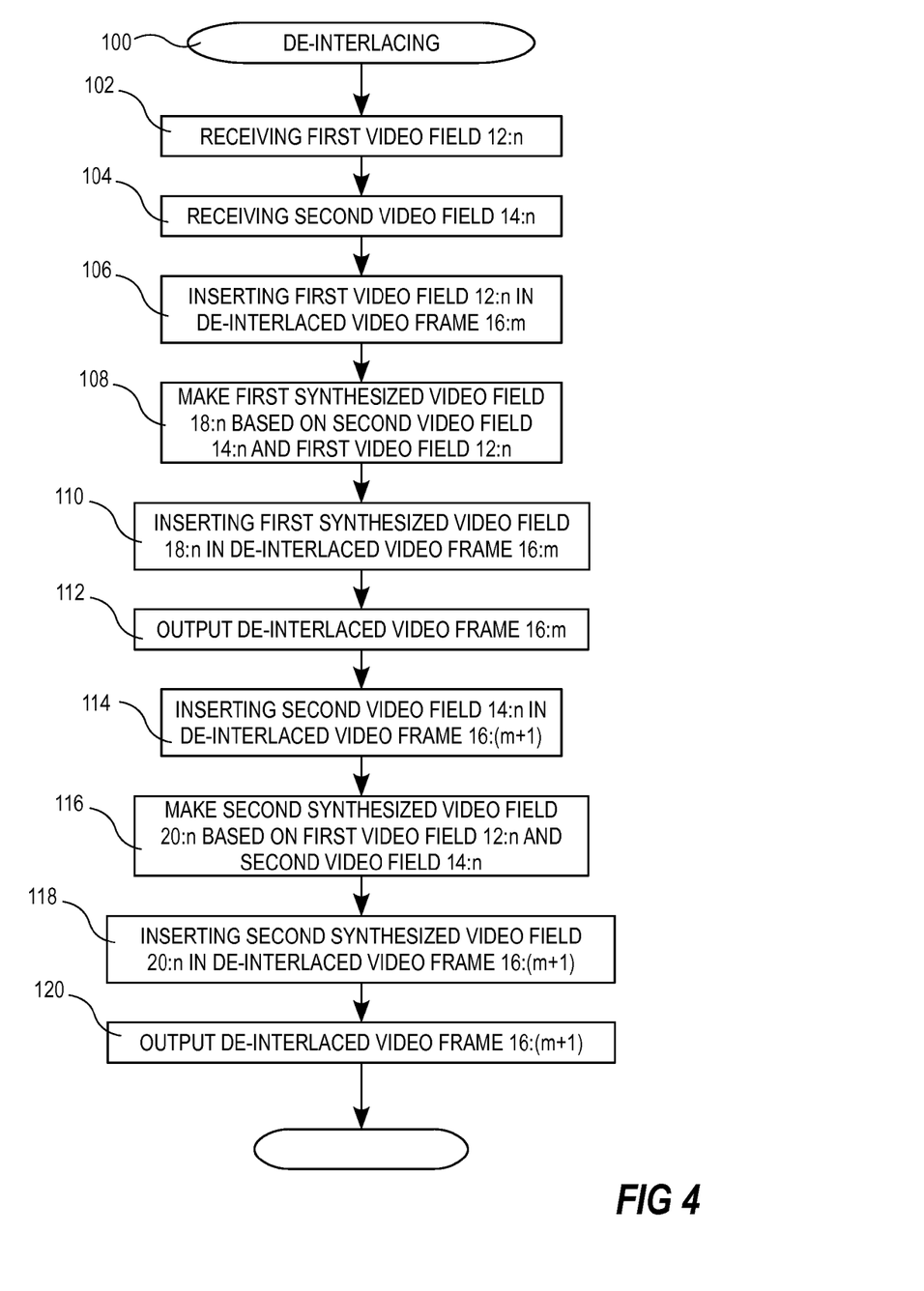
FIG. 4 is a flowchart showing a method for de-interlacing video according to one embodiment of the invention.

The present invention relates to a method and an apparatus for de-interlacing video signals captured by a camera generating interlaced video. According to one embodiment, the method for de-interlacing may be implemented by a process as shown in the flowchart of FIG. 4. The de-interlacing process, 100, includes receiving a first video field 12:$n$, representing the odd lines, of an n:th frame 10:$n$, step 102, and receiving a second video field 14:$n$, representing the even lines, of an n:th video frame 10:$n$, step 104.

In step 106, an m:th de-interlaced video frame 16:$m$, wherein m=2n, is formed by inserting the first video field 12:$n$ into the m:th de-interlaced video frame 16:$m$ in order to represent the odd lines of the m:th de-interlaced video frame 16:$m$. Further, a first synthesized video field 18:$n$ is formed based on the image data of the second video field 14:$n$ and the image data of the first video field 12:$n$, step 108. The first synthesized video field 18:$n$ is inserted in the de-interlaced video frame 16:$m$ in order to represent the even lines of the de-interlaced video frame 16:$m$, step 110. The de-interlaced video frame 16:$m$ is then outputted, step 112.

In Step 114, an (m+1):th de-interlaced video frame 16:($m$+1) is formed by inserting the second video field 14:$n$ into the (m+1):th de-interlaced video frame 16:($m$+1) in order to represent the even lines of the (m+1):th de-interlaced video frame 16:($m$+1). Further a second synthesized video field 20:$n$ is formed based on the image data of the first video field 12:$n$ and the image data of the second video field 14:$n$, step 116. The second synthesized video field 20:$n$ is inserted in the de-interlaced video frame 16:($m$+1), step 118. The de-interlaced video frame 16:($m$+1) is then outputted, step 120.

The output from this process will produce twice as many de-interlaced frames than the number of interlaced frames received by the process. Hence, if the received video has a frame rate of 30 fps (frames per second), then the output video will have a frame rate of 60 fps and correspondingly, if the received video has a frame rate of 25 fps, then the output video will have a frame rate of 50 fps.

The calculations disclosed herein are made in the Y Cb Cr color space, which is the normal color space used for video signals. All examples below use the luma part (Y signal) of the luma signal in the video signal. The luma signal is the gray scale part of the video. The same algorithm is then used on both chroma signals (Cb,Cr) in the video signal to complete the chroma part of the fields. De-interlacing can also be performed using this algorithm if the video signal has been transformed into another color space (RGB or other).

Figure 5:
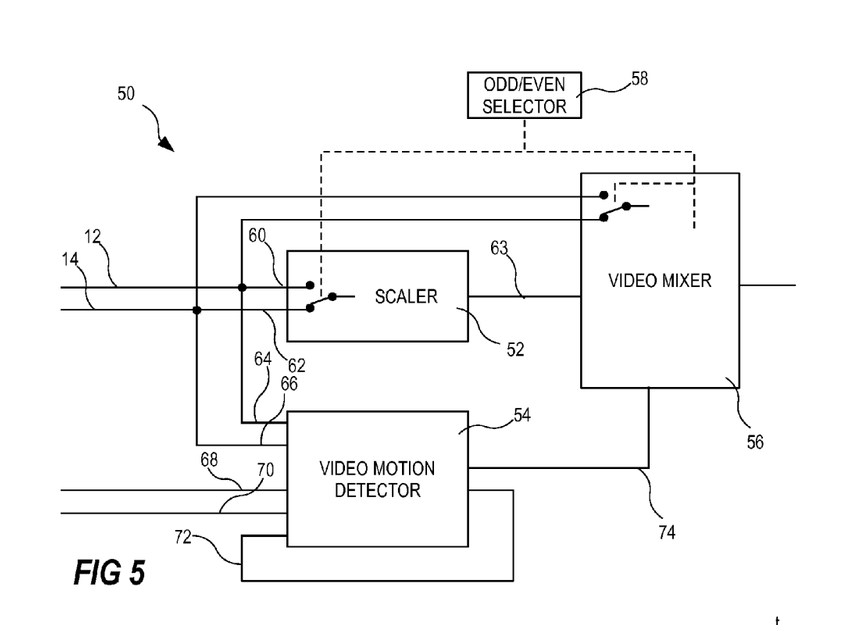
FIG. 5 is a schematic block diagram of a de-interlacer according to one embodiment of the invention.

Now referring to FIG. 5, according to one embodiment, a de-interlacer 50 includes a scaler 52, a video motion detector 54, and a video mixer 56. Moreover, the de-interlacer 50 includes an odd/even selector indicating if it is the first field 12 or the second field 14 that is to be the leading field in the processing generating the de-interlaced video frame. The scaler 52 is arranged to receive two inputs 60, 62, one for the first field 12 of the currently processed frame 10 and one for the second field 14 of the currently processed frame 10. The odd/even selector 58 indicates which one of the first field 12 or the second field 14 is to be processed by the scaler in order to be up-scaled. Then the scaler 52 is generates an output 63 of an up-scaled de-interlaced frame, which is based on the data of one of the fields 12 or 14. The up-scaled de-interlaced frame from the up-scaler is then sent to the video mixer 56. The video motion detector 54 includes two inputs 64, 66, receiving the first and second fields, 12, 14, respectively, of the currently processed frame 10. The video motion detector 54 also includes two inputs 68, 70, providing the first and second fields, respectively, of the previously processed frame. Another signal provided to the video motion detector 54 is a feedback signal 72 indicating the outcome of the previous video motion detection. Based on these inputs, the video motion detector 54 detects motion up to the video frame to be processed and generates a signal indicating the motion. This motion indicating signal is sent to the video mixer via line 74. In one embodiment, the output of the video motion detector 54 presents different levels of motion, e.g., levels 0-15, where 0 indicates no motion and 15 indicates the highest level of motion.

The video mixer is arranged to receive the up-scaled de-interlaced frame from the scaler 52 and the video motion signal from the video motion detector 54. Further, the video mixer 56 has access to the first field 12 and second field 14 of the frame currently being processed, from the input to the de-interlacer 50. The video mixer also keeps track of which one of the first field 12 and the second field 14 that is the one that is up-scaled in the scaler, i.e., which one of the fields which is the base field for the de-interlaced video frame currently being generated. The field currently being scaled is referred to as the base field for the de-interlaced video frame that is currently being generated. This act of keeping track is depicted in FIG. 5 by the odd/even selector.

Figure 6:
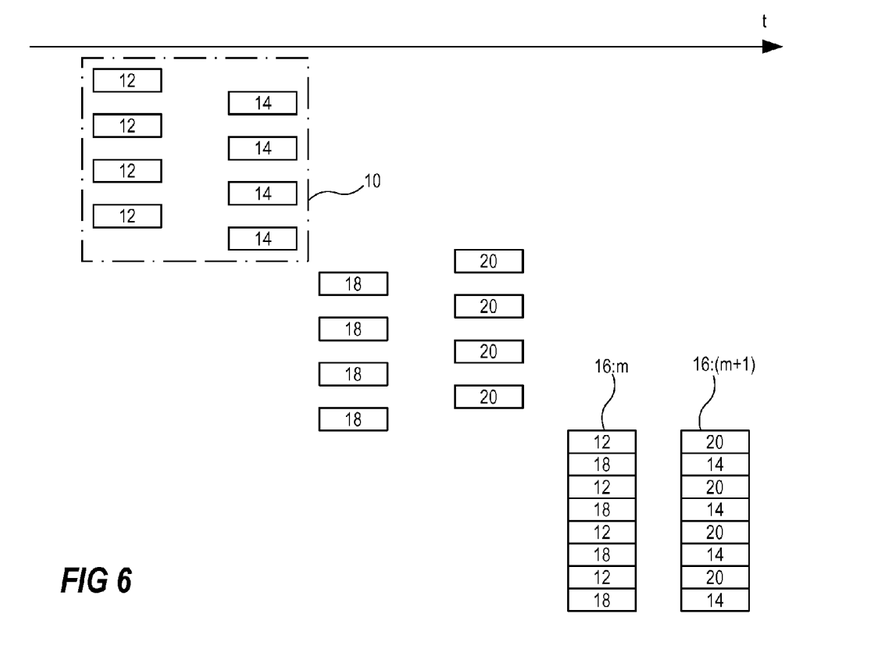
FIG. 6 is a schematic view of the relation of various fields of the de-interlacing process according to one embodiment of the invention.

The video mixer 56 is arranged to generate a de-interlaced video frame based on the image data from the first and second fields 12, 14, see FIG. 6. Let us assume that the first field 12 is representing the odd lines of the frame 10 currently processed and that the second field 14 is representing the even lines of the frame currently processed. If the first field 12 is the base field, then the mixer may put the lines of the first field 12 as the odd lines of the de-interlaced video frame 16:*m*. The mixer then may combine image data from the second field 14 with image data from the even lines of the up-scaled first field sent from the scaler into the even lines of the de-interlaced video frame 16:*m*. This generated set of even lines is the first synthesized field 18. Then the mixer outputs the de-interlaced video frame 16:*m*.

Subsequently, after the first field 12 has been used as the base field, the second field 14 is set to be the base field, e.g., the odd/even indicator may be switched from even to odd. The lines of the second field 14 are set as the even lines of the new de-interlaced video frame 16:(*m*+1). Then the mixer may combine image data from the first field 12 with image data from the odd lines of the up-scaled second field sent from the scaler into the odd lines of the de-interlaced video frame 16:(*m*+1). This generated set of odd lines is the second synthesized field 20. Then the mixer outputs the de-interlaced video frame 16:(*m*+1). Thereby two de-interlaced video frames 16:*m*, 16:(*m*+1), have been generated from one interlaced frame.

The combining of image data from the second field 14 with image data from the even lines of the up-scaled first field sent from the scaler and the combining of image data from the first field 12 with image data from the odd lines of the up-scaled second field sent from the scaler may be performed in a plurality of ways. However, according to one embodiment of the invention, the combining includes accessing the lines not included in the base field of the present operation from both the original imagery and from the up-scaled field. In the case of the first field being the base field, the second field is accessed and the even lines of the up-scaled field. In the case of the second field being the base field, the first field is accessed and the odd lines of the up-scaled field. In order to facilitate the understanding, next is described the set of lines not included in the base field of the present operation and which are from the original imagery for F (e.g., first field or second field depending on which one of them being the base field). The corresponding set of lines, e.g., odd or even lines, is accessed from the up-scaled field and is referred to as U. Moreover, video mixer 56 also takes into account the level of motion detected by the video motion detector. In one embodiment, the number of levels of motion indicated by the video motion detector 54 is sixteen (16). A person skilled in the art recognizes that another number of levels is applicable. The value of the level of detected motion is referred to as L and in this example the value may be $0 \leq L \leq 15$. The level range may also be expressed as $0 \leq L \leq Lmax$, $Lmax=15$. A synthesized field S representing the odd lines or the even lines, depending on if it is even or odd lines in the input values, may be expressed as:

$$S=(UL+F(Lmax-L))/Lmax$$

This equation describing linear blending will thus result in a synthesized field blending image data from the up-scaled field and from the original field and the more movement there is detected the more of the up-scaled image will be visible in the resulting synthesized field. The skilled person recognizes that there exist more methods for generating the synthesized field.

Figure 7:
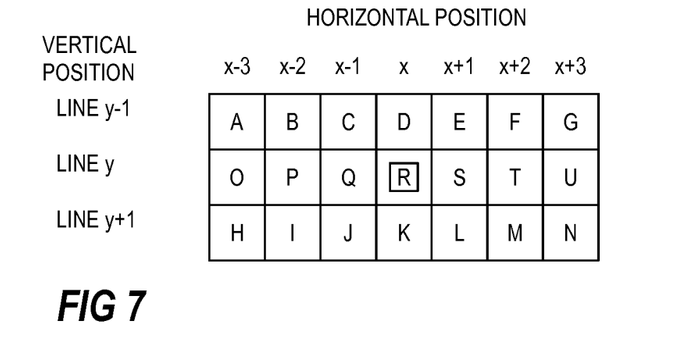
FIG. 7 is depicting a schematic view of an up-scaling kernel according to one embodiment of the invention.

According to one embodiment, the scaler 52 includes an edge analyzer and an up-scaler. The edge analyzer is arranged to find and reconstruct edges, e.g., the edge analyzer may be used to detect vertical edges that can be used to guide the interpolation. In one embodiment, the up-scaler is arranged to use an up-scaling kernel (3×7 kernel) as the one depicted in FIG. 7. It is evident for the skilled person that other up-scaling kernels may alternatively be used. In the kernel, the pixels O-U represent the line y to be estimated, the pixels A-G are the available line y−1 above the line y to be estimated, and the pixels H-N are the available line y+1 below the line y to be estimated.

A default up-scaling algorithm is selected for up-scaling in case of the result from at least one other more sophisticated up-scaling algorithms does not meet the quality requirements of the up-scaling, e.g., if the other algorithms introduces non acceptable artefacts. In the default up-scaling algorithm, the up-scaler simply estimates the presently processed pixel as R=(D+K)/2, referring to the positions of the kernel in FIG. 7. This up-scaling algorithm does not introduce any other artefacts than normal up-scaling issues like lower resolution and, moreover, it works well for high frequency areas.

In one more advanced up-scaling algorithm, the edge analyzer is implemented to detect edges and the direction of the edges by means of a "block" matching algorithm that minimizes the calculated SAD (Sum of Absolute Differences) over a number of possible edge directions. This up-scaling algorithm further includes a selection process designed to avoid selection of directions that introduce artefacts.

The tested directions are referred to as d1-d7, the number of tested directions may vary depending on the required quality and depending on how fast the test has to be able to be performed. The directions of d1-d7 may be the directions illustrated in FIG. 8.

Figure 8:
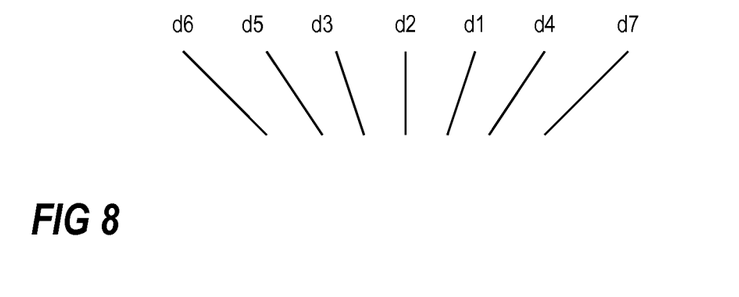
FIG. 8 depicts directions used in an up-scaling algorithm according to one embodiment of the invention.

Formulas for the directions may be selected as below. The block width has been set to 3 or, optionally, to 5. A block width of 5 may result in less noise.

```
d1 = abs(D – I);
d1 += abs(E – J)*2;
d1 += abs(F – K);
d1 += abs(C – H);      // optional
d1 += abs(G – L);      // optional
d2 = abs(C – J);
d2 += abs(D – K)*2;
d2 += abs(E – L);
d2 += abs(B – I);      // optional
d2 += abs(F – M);      // optional
d3 = abs(B – K);
d3 += abs(C – L)*2;
d3 += abs(D – M);
d3 += abs(A – J);      // optional
d3 += abs(E – N);      // optional
d4 = abs(E – H);
d4 += abs(F – I)*2;
d4 += abs(G – J);
d4 += abs(D – HH);     // optional
d4 += abs(GG – K);     // optional
d5 = abs(A – L);
d5 += abs(B – M)*2;
d5 += abs(C – N);
d5 += abs(AA – J);     // optional
d5 += abs(D – NN);     // optional
```

Then the selection of the direction may be performed by means of a formula such as:

$$dmin=min(d1,min(d2,min(d3,min(d4,d5))));$$

When the direction is found, the selected direction may be used in interpolating by calculating a mean value between two pixels in the selected direction.

If d2 is selected, then (D+K)/2 is used. If d3 is selected, then (C+L)/2 is used. If d5 is selected, then (B+M)/2 is used. If d1 is selected, then (E+J)/2 is used. If d4 is selected, then (F+I)/2 is used.

According to one embodiment, the video motion detector 54 for de-interlacing performed by a current line being is matched against the corresponding line in a previous frame. A field representing odd lines should be matched to a previous field of odd lines and a field representing even lines should be matched to a previous field of even frames. The lines above and below the current row is matched with their corresponding lines. The match is measured with a noise adjusted SAD value created calculating the absolute difference of linearized pixel values (inverse gamma). The position of pixels in the process below is represented by the letters A-Z shown in FIG. 9.

Sad_th is a noise removal threshold, and adjusted to fit this typical noise level of the signal. Typically this number is 1-10% of a full scale signal.

Figure 9:
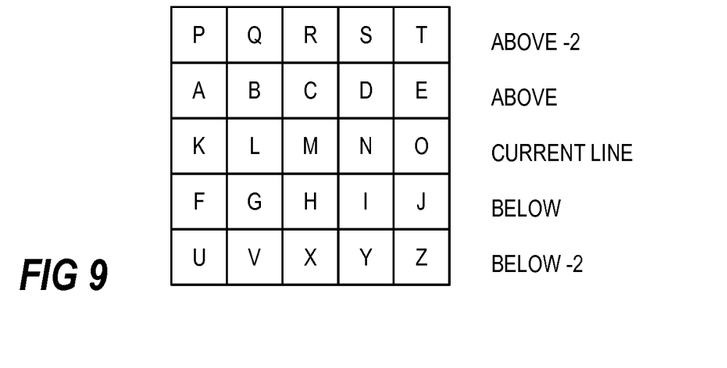
FIG. 9 depicts pixel positions relating to one embodiment of the video motion detecting process.

```
sad_curr=0;
// ** SAD current line **
diff = abs(igamma_lut[K0]-igamma_lut[K1]);
diff = diff – sad_th;
if(diff<0)diff=0;
sad_curr += diff;
diff = abs(igamma_lut[L0]-igamma_lut[L1]);
diff = diff – sad_th;
if(diff<0)diff=0;
sad_curr += diff;
diff = abs(igamma_lut[M0]-igamma_lut[M1]);
diff = diff – sad_th;
if(diff<0)diff=0;
sad_curr += diff;
diff = abs(igamma_lut[N0]-igamma_lut[N1]);
diff = diff – sad_th;
if(diff<0)diff=0;
sad_curr += diff;
diff = abs(igamma_lut[O0]-igamma_lut[O1]);
diff = diff – sad_th;
if(diff<0)diff=0;
sad_curr += diff;
. . . continued for all pixels in FIG. 9.
```

In another embodiment, the value sad_curr is calculated with a larger mean value based kernel:

```
sad4_curr=0
m0=(K0+P0+U0+L0+Q0+V0)/6;
m1=(K1+P1+U1+L1+Q1+V1)/6;
diff = abs(igamma_lut[m0]-igamma_lut[m1]);
diff = diff – (sad_th/2);
if(diff<0)diff=0;
sad4_curr += diff;
m0=(L0+Q0+V0+M0+R0+X0)/6;
m1=(L1+Q1+V1+M1+R1+X1)/6;
diff = abs(igamma_lut[m0]-igamma_lut[m1]);
diff = diff – (sad_th/2);
if(diff<0)diff=0;
sad4_curr += diff;
m0=(M0+R0+X0+N0+S0+Y0)/6;
m1=(M1+R1+X1+N1+S1+Y1)/6;
diff = abs(igamma_lut[m0]-igamma_lut[m1]);
diff = diff – (sad_th/2);
if(diff<0)diff=0;
sad4_curr += diff;
m0=(N0+S0+Y0+O0+T0+Z0)/6;
m1=(N1+S1+Y1+O1+T1+Z1)/6;
diff = abs(igamma_lut[m0]-igamma_lut[m1]);
diff = diff – (sad_th/2);
if(diff<0)diff=0;
sad4_curr += diff;
m0=(A0+F0+B0+G0)/4;
m1=(A1+F1+B1+G1)/4;
diff = abs(igamma_lut[m0]-igamma_lut[m1]);
diff = diff – (sad_th/2);
if(diff<0)diff=0;
sad4_curr += diff;
m0=(B0+G0+C0+H0)/4;
m1=(B1+G1+C1+H1)/4;
diff = abs(igamma_lut[m0]-igamma_lut[m1]);
diff = diff – (sad_th/2);
if(diff<0)diff=0;
sad4_curr += diff;
m0=(C0+H0+D0+I0)/4;
m1=(C1+H1+D1+I1)/4;
diff = abs(igamma_lut[m0]-igamma_lut[m1]);
diff = diff – (sad_th/2);
if(diff<0)diff=0;
sad4_curr += diff;
m0=(D0+I0+E0+J0)/4;
m1=(D1+I1+E1+J1)/4;
diff = abs(igamma_lut[m0]-igamma_lut[m1]);
diff = diff – (sad_th/2);
if(diff<0)diff=0;
sad4_curr += diff;
``` wherein the number behind the position letter indicates that the position relates to the current frame, 0, and to a previous frame, 1.

A final SAD value to be used in calculating the level of motion may be calculated as:

```
int sad_lut[16]= { 1,2,4,6,8,10,12,14,16,32,64,80,128,160,256,2048 };
L = 0
If (high_noise_signal) {
    sad = sad_curr;
} else {
    sad = sad4_curr;
}
```

The L value may then be calculated from the look up table:

```
if(sad<sad_lut[0]) L=15;
  else if(sad<sad_lut[1]) L=14;
  else if(sad<sad_lut[2]) L=13;
  else if(sad<sad_lut[3]) L=12;
  else if(sad<sad_lut[4]) L=11;
  else if(sad<sad_lut[5]) L=10;
  else if(sad<sad_lut[6]) L=9;
  else if(sad<sad_lut[7]) L=8;
  else if(sad<sad_lut[8]) L=7;
  else if(sad<sad_lut[9]) L=6;
  else if(sad<sad_lut[10]) L=5;
  else if(sad<sad_lut[11]) L=4;
  else if(sad<sad_lut[12]) L=3;
  else if(sad<sad_lut[13]) L=2;
  else if(sad<sad_lut[14]) L=1;
  else L=0;
```

According to another embodiment, the de-interlacing process is as described above with the difference that the second field used in a de-interlacing having the first field as a base field do not belong to the same frame as the first field but to the previous frame. Accordingly, the synthesized field is always based on a field that is captured earlier than the base field, e.g., the field capture just before the base field. In an alternative embodiment, the synthesized field may always be based on a field that is captured later than the base field.

The invention claimed is:
1. A method for de-interlacing interlaced video, said method comprising:
receiving a first video field and a second video field of an interlaced video frame;
generating a first video frame by inserting the first video field in the first video frame on every second line of the first video frame and by inserting a first synthesized video field on lines of the first video frame not populated by the first video field, wherein video data of the first synthesized video field is based exclusively on video data of the second video field and on video data of the first video field;

generating a second video frame by inserting the second video field in the second video frame on every second line of the second video frame and by inserting a second synthesized video field on lines of the second video frame not populated by the second video field, wherein video data of the second synthesized video field is based exclusively on the video data of the second video field and on the video data of the first video field; and outputting two de-interlaced video frames for every received interlaced video frame.

2. The method according to claim 1,
wherein the first synthesized video field is generated by combining image data from the second video field with image data from corresponding lines of an up-scaled first field generated by a scaler, and
wherein the second synthesized video field is generated by combining of image data from the first video field with image data from corresponding lines of an up-scaled second field generated by the scaler.

3. The method according to claim 2, wherein the received first video field and the second video field are received at different points in time.

4. The method according to claim 3, wherein the first video field is received before the second video field.

5. The method according claim 4, wherein each of the first and second synthesized video fields is generated by applying algorithm $S=(UL+F(L_{max}-L))/L_{max}$ on the first and second video fields that the synthesized video field is to be based on, wherein S is the synthesized video field, U is the corresponding field generated by the scaler, F is the corresponding field in the interlaced frame, L is an indicator of a motion level in the received frames, and $L_{max}$ is the largest value $L_{max}$ may represent.

6. The method according to claim 1, wherein the received first video field and the second video field are received at different points in time.

7. The method according to claim 1, wherein the first video field is received before the second video field.

8. The method according to claim 1, wherein each of the first and second synthesized video fields is generated by applying algorithm $S=(UL+F(L_{max}-L))/L_{max}$ on the first and second video fields that the synthesized video field is to be based on, wherein S is the synthesized video field, U is the corresponding field generated by the scaler, F is the corresponding field in the interlaced frame, L is an indicator of a motion level in the received frames, and $L_{max}$ is the largest value $L_{max}$ may represent.

9. A de-interlacer, comprising:
the de-interlacer configured to receive a first video field and a second video field of an interlaced video frame;
a video mixer configured to generate a first video frame by inserting the first video field in the first video frame on every second line of the first video frame and by inserting a first synthesized video field on lines of the first video frame not populated by the first video field, wherein video data of the first synthesized video field is based exclusively on video data of the second video field and on video data of the first video field;
the video mixer configured to generate a second video frame by inserting the second video field in the second video frame on every second line of the second video frame and by inserting a second synthesized video field on lines of the second video frame not populated by the second video field, wherein video data of the second synthesized video field is based exclusively on the video data of the second video field and on the video data of the first video field; and
the video mixer configured to output two de-interlaced video frames for every received interlaced video frame.

10. The de-interlacer according to claim 9,
wherein the first synthesized video field is generated by combining image data from the second video field with image data from corresponding lines of an up-scaled first field generated by a scaler, and
wherein the second synthesized video field is generated by combining of image data from the first video field with image data from corresponding lines of an up-scaled second field generated by the scaler.

11. The method according to claim 9, wherein the received first video field and the second video field are received at different points in time.

12. The de-interlacer according to claim 9, wherein the first video field is received before the second video field.

13. The de-interlacer according claim 9, wherein each of the first and second synthesized video fields is generated by applying algorithm $S=(UL+F(L_{max}-L))/L_{max}$ on the first and second video fields that the synthesized video field is to be based on, wherein S is the synthesized video field, U is the corresponding field generated by the scaler, F is the corresponding field in the interlaced frame, L is an indicator of a motion level in the received frames, and $L_{max}$ is the largest value $L_{max}$ may represent.

14. A de-interlacer, comprising:
the de-interlacer configured to receive a first video field and a second video field of an interlaced video frame;
a video mixer configured to generate a first video frame from the first video field and a first synthesized video field, wherein video data of the first synthesized video field is based exclusively on video data of the second video field and on video data of the first video field;
the video mixer configured to generate a second video frame from the second video field and a second synthesized video field, wherein video data of the second synthesized video field is based exclusively on the video data of the second video field and on the video data of the first video field; and
the video mixer configured to output two de-interlaced video frames for every received interlaced video frame.

15. The de-interlacer according to claim 14,
wherein the first synthesized video field is generated by combining image data from the second video field with image data from corresponding lines of an up-scaled first field generated by a scaler, and
wherein the second synthesized video field is generated by combining image data from the first video field with image data from corresponding lines of an up-scaled second field generated by the scaler.

16. The method according to claim 14, wherein the received first video field and the second video field are received at different points in time.

17. The de-interlacer according to claim 14, wherein the first video field is received before the second video field.

18. The de-interlacer according claim 14, wherein each of the first and second synthesized video fields is generated by applying algorithm $S=(UL+F(L_{max}-L))/L_{max}$ on the first and second video fields that the synthesized video field is to be based on, wherein S is the synthesized video field, U is the corresponding field generated by the scaler, F is the corresponding field in the interlaced frame, L is an indicator of a motion level in the received frames, and $L_{max}$ is the largest value $L_{max}$ may represent.

19. A method for de-interlacing interlaced video, said method comprising:
- receiving a first video field and a second video field of an interlaced video frame;
- generating a first video frame from the first video field and a first synthesized video field, wherein video data of the first synthesized video field is based exclusively on video data of the second video field and on video data of the first video field;
- generating a second video frame from the second video field and a second synthesized, wherein video data of the second synthesized video field is based exclusively on the video data of the second video field and on the video data of the first video field; and
- outputting two de-interlaced video frames for every received interlaced video frame.

20. The method according to claim 19,
- wherein the first synthesized video field is generated by combining image data from the second video field with image data from corresponding lines of an up-scaled first field generated by a scaler, and
- wherein the second synthesized video field is generated by combining of image data from the first video field with image data from corresponding lines of an up-scaled second field generated by the scaler.

* * * * *